US011757528B2

(12) United States Patent
Bissessur et al.

(10) Patent No.: US 11,757,528 B2
(45) Date of Patent: Sep. 12, 2023

(54) SUPERVISION OF AN OPTICAL PATH INCLUDING AN AMPLIFIER

(71) Applicant: Alcatel Submarine Networks, Nozay (FR)

(72) Inventors: Hans Bissessur, Gentilly (FR); Omar Ait Sab, Arpajon (FR)

(73) Assignee: Alcatel Submarine Networks, Nozay (FR)

( * ) Notice: Subject to any disclaimer, the term of this patent is extended or adjusted under 35 U.S.C. 154(b) by 0 days.

(21) Appl. No.: 17/542,719

(22) Filed: Dec. 6, 2021

(65) Prior Publication Data
US 2022/0182138 A1 Jun. 9, 2022

(30) Foreign Application Priority Data
Dec. 8, 2020 (EP) .................................... 20306517

(51) Int. Cl.
*H04B 10/077* (2013.01)
*H04B 10/079* (2013.01)
(Continued)

(52) U.S. Cl.
CPC ... *H04B 10/0777* (2013.01); *H04B 10/07957* (2013.01); *H04B 10/2912* (2013.01); *H04B 10/071* (2013.01)

(58) Field of Classification Search
CPC .......... H04B 10/0777; H04B 10/07957; H04B 10/2912; H04B 10/071; H04B 10/077; H04B 10/298
(Continued)

(56) References Cited

U.S. PATENT DOCUMENTS 5,737,105 A * 4/1998 Ohta .................. H04B 10/2939
359/347
9,130,672 B2 * 9/2015 Zhang .................. H04B 10/298
(Continued)

FOREIGN PATENT DOCUMENTS

CN 1859176 A * 11/2006
EP 1496723 A1 * 1/2005
(Continued)

OTHER PUBLICATIONS

EP Search Report mailed in corresponding EP 20306517.2 dated Jun. 10, 2021, 8 pages.
(Continued)

*Primary Examiner* — Abbas H Alagheband
(74) *Attorney, Agent, or Firm* — TONG, REA, BENTLEY & KIM, LLC

(57) ABSTRACT

Various example embodiments for supporting supervision in optical communication systems are presented. Various example embodiments for supporting supervision in optical communication systems may be configured to support supervision of an optical path including a remote optically pumped amplifier (ROPA) and, thus, supervision of the ROPA. Various example embodiments for supporting supervision of an optical path including a ROPA may be configured to support supervision of the optical path including the ROPA based on a pair of optical supervisory paths configured to extract a pair of optical supervisory signals from an optical path in a first direction and to insert the pair of optical supervisory signals into an optical path in a second direction. Various example embodiments for supporting supervision of an optical path including a ROPA may be configured to support supervision of the optical path including the ROPA based on a pair of optical time-domain reflectometer (OTDR) paths.

20 Claims, 7 Drawing Sheets

(51) Int. Cl.
*H04B 10/291* (2013.01)
*H04B 10/071* (2013.01)

(58) Field of Classification Search
USPC .......................................................... 398/177
See application file for complete search history.

(56) References Cited

U.S. PATENT DOCUMENTS

| | | | | |
|---|---|---|---|---|
| 9,838,136 | B2 * | 12/2017 | Chang | ............... H01S 3/094061 |
| 10,313,020 | B2 * | 6/2019 | Chang | ..................... H01S 3/094 |
| 10,833,766 | B2 * | 11/2020 | Ait Sab | ................ H04B 10/077 |
| 2002/0131696 | A1 * | 9/2002 | Yokoyama | ......... H04B 10/0777 |
| | | | | 385/27 |
| 2004/0161191 | A1 * | 8/2004 | Yokoyama | ......... H04B 10/0777 |
| | | | | 385/27 |
| 2004/0161244 | A1 * | 8/2004 | Yokoyama | ........... H04B 10/071 |
| | | | | 398/177 |
| 2008/0240713 | A1 * | 10/2008 | Lu | .......................... H04B 10/03 |
| | | | | 398/17 |
| 2014/0212131 | A1 * | 7/2014 | Zhang | .................. H04B 10/071 |
| | | | | 398/16 |
| 2017/0365971 | A1 | 12/2017 | Pelouch et al. | |
| 2018/0069637 | A1 | 3/2018 | Chang et al. | |
| 2019/0148902 | A1 | 5/2019 | Pelouch | |
| 2020/0127735 | A1 * | 4/2020 | Ait Sab | ............... H04B 10/0777 |
| 2020/0195341 | A1 * | 6/2020 | Ait Sab | .................. H04B 10/27 |
| 2020/0304208 | A1 | 9/2020 | Lutz et al. | |

FOREIGN PATENT DOCUMENTS

| | | | | |
|---|---|---|---|---|
| EP | 1496723 | A1 | 1/2005 | |
| EP | 2088697 | B1 * | 3/2012 | ........... H04B 10/035 |
| GB | 2294374 | A * | 4/1996 | ........... H04B 10/035 |
| JP | 2000059306 | A * | 2/2000 | ............. H04B 10/07 |
| WO | WO 1997/023964 | | 7/1997 | |
| WO | 2007036108 | A1 | 4/2007 | |

OTHER PUBLICATIONS

Zhu, B. et al., "Ultra-Long Reach 4 x 100 Gb/s Unrepeatered Transmissions With Real-Time Signal Processing Using Large $A_{eff}$ Ultra-Low Loss Fiber," Journal of Lightwave Technology, vol. 37, Issue 24, Dec. 15, 2019, 8 pages.

Sutili, T., et al., "Experimental Characterization of Remote Optically Pumped Amplifier," 2019 SBFoton International Optics and Photonics Conference, Sao Paulo, Brazil, Oct. 9, 2019, 5 pages.

* cited by examiner

SUPERVISION OF AN OPTICAL PATH INCLUDING AN AMPLIFIER

CROSS-REFERENCE TO RELATED APPLICATIONS

This application is based on and claims the benefit of European Patent Application No. 20306517.2, filed on Dec. 8, 2020, which is hereby incorporated herein by reference in its entirety.

TECHNICAL FIELD

Various example embodiments relate generally to optical communication systems, and more particularly but not exclusively, to supporting supervision of an optical path including a remote optically pumped amplifier (ROPA).

BACKGROUND

Communication systems, including optical communication systems, may employ various mechanisms for supporting reliability of communications via the communication systems. For example, various optical communication systems may employ various supervision mechanisms to support reliability of communications via the optical communication systems.

SUMMARY

In at least some example embodiments, an apparatus includes a remote optically pumped amplifier, ROPA, configured to amplify a first optical signal of a first optical path configured to propagate the first optical signal in a first direction, and a set of elements configured to extract a first optical supervisory signal from the first optical path before an input to the ROPA, extract a second optical supervisory signal from the first optical path after an output of the ROPA, and insert the first optical supervisory signal and the second optical supervisory signal into a second optical path configured to propagate a second optical signal in a second direction. In at least some example embodiments, the first optical supervisory signal has a first wavelength and the second optical supervisory signal has a second wavelength different than the first wavelength. In at least some example embodiments, the set of elements comprises one or more first elements configured to extract the first optical supervisory signal from the first optical path before the input to the ROPA, one or more second elements configured to extract the second optical supervisory signal from the first optical path after the output of the ROPA, and one or more third elements configured to insert the first optical supervisory signal and the second optical supervisory signal into the second optical path. In at least some example embodiments, the one or more first elements comprises a coupler and a transmission filter. In at least some example embodiments, the one or more first elements comprises a coupler and a reflector. In at least some example embodiments, the one or more first elements comprises a transmission filter. In at least some example embodiments, the one or more second elements comprises a coupler and a transmission filter. In at least some example embodiments, the one or more second elements comprises a coupler and a reflector. In at least some example embodiments, the one or more second elements comprises a transmission filter. In at least some example embodiments, the one or more third elements comprises a coupler. In at least some example embodiments, the one or more third elements comprises a first coupler configured to combine the first optical supervisory signal and the second optical supervisory signal onto a common path and a second coupler configured to insert the first optical supervisory signal and the second optical supervisory signal from the common path into the second optical path. In at least some example embodiments, the one or more third elements comprises a transmission filter. In at least some example embodiments, the one or more third elements comprises a coupler and a transmission filter. In at least some example embodiments, the set of elements is configured to support a first optical supervisory path configured to propagate the first optical supervisory signal from the first optical path to the second optical path and a second optical supervisory path configured to propagate the second optical supervisory signal from the first optical path to the second optical path. In at least some example embodiments, the first optical supervisory path comprises at least one of a coupler, a transmission filter, or a reflector, and the second optical supervisory path comprises at least one of a coupler, a transmission filter, or a reflector. In at least some example embodiments, the apparatus further comprises an optical time-domain reflectometer, OTDR, path coupled from a location on the first optical path after an output of the ROPA to a location on the second optical path. In at least some example embodiments, the location on the first optical path is between the output of the ROPA and a point of extraction of the second optical supervisory signal from the first optical path, wherein the location on the second optical path is downstream of a point of insertion of the first optical supervisory signal and the second optical supervisory signal into the second optical path. In at least some example embodiments, the ROPA comprises a receiver ROPA. In at least some example embodiments, the ROPA comprises a transmitter ROPA.

In at least some example embodiments, a method includes extracting, from a first optical path including a remote optically pumped amplifier, ROPA, configured to amplify a first optical signal propagating on the first optical path in a first direction, a first optical supervisory signal and a second optical supervisory signal wherein the first optical supervisory signal is extracted from the first optical path before an input to the ROPA and the second optical supervisory signal is extracted from the first optical path after an output of the ROPA and inserting the first optical supervisory signal and the second optical supervisory signal into a second optical path configured to propagate a second optical signal in a second direction. In at least some example embodiments, the first optical supervisory signal has a first wavelength and the second optical supervisory signal has a second wavelength different than the first wavelength. In at least some example embodiments, the first optical supervisory signal is extracted from the first optical path before the input to the ROPA using one or more first elements, the second optical supervisory signal is extracted from the first optical path after the output of the ROPA using one or more second elements, and the first optical supervisory signal and the second optical supervisory signal are inserted into the second optical path using one or more third elements. In at least some example embodiments, the one or more first elements comprises a coupler and a transmission filter. In at least some example embodiments, the one or more first elements comprises a coupler and a reflector. In at least some example embodiments, the one or more first elements comprises a transmission filter. In at least some example embodiments, the one or more second elements comprises a coupler and a transmission filter. In at least some example embodiments, the one or more second elements comprises a coupler and a reflector. In at least some example embodiments, the one or more second elements comprises a transmission filter. In at least some example embodiments, the one or more third elements comprises a coupler. In at least some example embodiments, the one or more third elements comprises a first coupler configured to combine the first optical supervisory signal and the second optical supervisory signal onto a common path and a second coupler configured to insert the first optical supervisory signal and the second optical supervisory signal from the common path into the second optical path. In at least some example embodiments, the one or more third elements comprises a transmission filter. In at least some example embodiments, the one or more third elements comprises a coupler and a transmission filter. In at least some example embodiments, the first optical supervisory signal is propagated from the first optical path to the second optical path using a first optical supervisory path and the second optical supervisory signal is propagated from the first optical path to the second optical path using a second optical supervisory path. In at least some example embodiments, the first optical supervisory path comprises at least one of a coupler, a transmission filter, or a reflector, and the second optical supervisory path comprises at least one of a coupler, a transmission filter, or a reflector. In at least some example embodiments, the method further comprises propagating an optical time-domain reflectometer, OTDR, signal via an OTDR path coupled from a location on the first optical path after an output of the ROPA to a location on the second optical path. In at least some example embodiments, the location on the first optical path is between the output of the ROPA and a point of extraction of the second optical supervisory signal from the first optical path, wherein the location on the second optical path is downstream of a point of insertion of the first optical supervisory signal and the second optical supervisory signal into the second optical path. In at least some example embodiments, the ROPA comprises a receiver ROPA. In at least some example embodiments, the ROPA comprises a transmitter ROPA.

In at least some example embodiments, an apparatus includes a remote optically pumped amplifier, ROPA, configured to amplify a first optical signal of a first optical path configured to propagate the first optical signal in a first direction, and means for extracting a first optical supervisory signal from the first optical path before an input to the ROPA, means for extracting a second optical supervisory signal from the first optical path after an output of the ROPA, and means for inserting the first optical supervisory signal and the second optical supervisory signal into a second optical path configured to propagate a second optical signal in a second direction. In at least some example embodiments, the first optical supervisory signal has a first wavelength and the second optical supervisory signal has a second wavelength different than the first wavelength. In at least some example embodiments, the means for extracting the first optical supervisory signal from the first optical path before an input to the ROPA comprises a coupler and a transmission filter. In at least some example embodiments, the means for extracting the first optical supervisory signal from the first optical path before an input to the ROPA comprises a coupler and a reflector. In at least some example embodiments, the means for extracting the first optical supervisory signal from the first optical path before an input to the ROPA comprises a transmission filter. In at least some example embodiments, the means for extracting the second optical supervisory signal from the first optical path after the output of the ROPA comprises a coupler and a transmission filter. In at least some example embodiments, the means for extracting the second optical supervisory signal from the first optical path after the output of the ROPA comprises a coupler and a reflector. In at least some example embodiments, the means for extracting the second optical supervisory signal from the first optical path after the output of the ROPA comprises a transmission filter. In at least some example embodiments, the means for inserting the first optical supervisory signal and the second optical supervisory signal into the second optical path comprises a coupler. In at least some example embodiments, the means for inserting the first optical supervisory signal and the second optical supervisory signal into the second optical path comprises a first coupler configured to combine the first optical supervisory signal and the second optical supervisory signal onto a common path and a second coupler configured to insert the first optical supervisory signal and the second optical supervisory signal from the common path into the second optical path. In at least some example embodiments, the means for inserting the first optical supervisory signal and the second optical supervisory signal into the second optical path comprises a transmission filter. In at least some example embodiments, the means for inserting the first optical supervisory signal and the second optical supervisory signal into the second optical path comprises a coupler and a transmission filter. In at least some example embodiments, the means for extracting the first optical supervisory signal from the first optical path before an input to the ROPA, the means for extracting the second optical supervisory signal from the first optical path after an output of the ROPA, and the means for inserting the first optical supervisory signal and the second optical supervisory signal into the second optical path comprises are configured to support a first optical supervisory path configured to propagate the first optical supervisory signal from the first optical path to the second optical path and a second optical supervisory path configured to propagate the second optical supervisory signal from the first optical path to the second optical path. In at least some example embodiments, the first optical supervisory path comprises at least one of a coupler, a transmission filter, or a reflector, and the second optical supervisory path comprises at least one of a coupler, a transmission filter, or a reflector. In at least some example embodiments, the apparatus further comprises an optical time-domain reflectometer, OTDR, path coupled from a location on the first optical path after an output of the ROPA to a location on the second optical path. In at least some example embodiments, the location on the first optical path is between the output of the ROPA and a point of extraction of the second optical supervisory signal from the first optical path, wherein the location on the second optical path is downstream of a point of insertion of the first optical supervisory signal and the second optical supervisory signal into the second optical path. In at least some example embodiments, the ROPA comprises a receiver ROPA. In at least some example embodiments, the ROPA comprises a transmitter ROPA.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various example embodiments for supporting supervision in optical communication systems are presented. Various example embodiments for supporting supervision in optical communication systems may be configured to support supervision of an optical path including a remote optically pumped amplifier (ROPA) and, thus, to also support supervision of the ROPA. Various example embodiments for supporting supervision of an optical path including a ROPA may be configured to support supervision of the optical path including the ROPA based on a pair of optical supervisory paths configured to extract a pair of optical supervisory signals from an optical path in a first direction and to insert the pair of optical supervisory signals into an optical path in a second direction. Various example embodiments for supporting supervision of an optical path including a ROPA may be configured to support supervision of the optical path including the ROPA based on a pair of optical time-domain reflectometer (OTDR) paths. Various example embodiments for supporting supervision of an optical path including a ROPA may be configured to support supervision of the optical path including the ROPA based on the pair of optical supervisory paths and the pair of OTDR paths. It will be appreciated that the ROPA may be a receiver ROPA (e.g., a ROPA disposed at or near a receive side of an optical communication channel) or a transmitter ROPA (e.g., a ROPA disposed at or near a transmit side of an optical communication channel). It is noted that these and various other example embodiments and associated advantages or potential advantages of supporting supervision of optical communication systems may be further understood by way of reference to the various figures, which are discussed further below.

Figure 1:
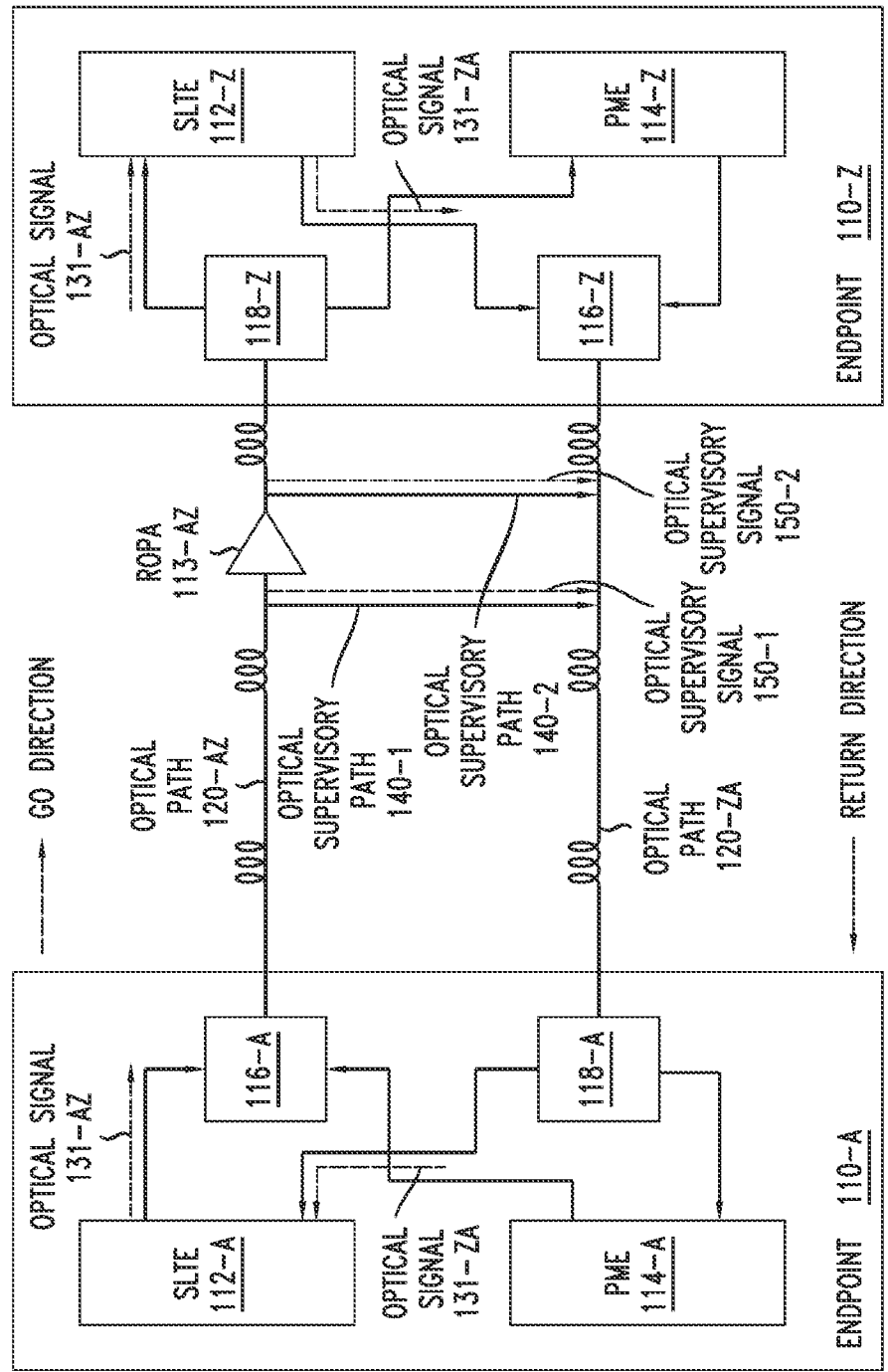
FIG. 1 depicts an example embodiment of an optical communication system including an optical path including a remote optically pumped amplifier (ROPA) and configured to support supervision of the optical path including the ROPA based on a pair of optical supervisory paths.

FIG. 1 depicts an example embodiment of an optical communication system including an optical path including a ROPA and configured to support supervision of the optical path including the ROPA based on a pair of optical supervisory paths.

The optical communication system 100 is configured to support optical communications. The optical communication system 100 may support optical communications in various contexts. For example, the optical communication system 100 may be an optical submarine transmission system which may operate as the backbone of an international transmission network, an optical distribution system supporting fiber to the home (FTTH), or the like. For example, the optical communication system 100 may be an unrepeatered submarine optical transmission system. For example, the optical communication system may be an unrepeatered submarine optical transmission system including a remote optically pumped amplifier (ROPA). It will be appreciated that, since unrepeatered submarine optical transmission systems do not require active components on the line (and, therefore, no cable powering) and can be operated on relatively short distances (typically less than 500 km), then, for maximum reach, a ROPA is often inserted on the line (generally at the receiver side where the signal level is low, although a ROPA could be inserted at the transmitter end) and the optical pump which is needed for amplification reaches the ROPA from the terminals through the fiber (e.g., either a dedicated fiber or the transmission fiber itself). It will be appreciated that, although primarily presented herein within the context of providing supervisory signals for ROPAs in a particular type of optical communication system (namely, an unrepeatered submarine optical transmission system), various example embodiments presented herein may be used for providing supervisory signals for optical paths including ROPAs in various other types of optical communication systems.

The optical communication system 100 is configured to support optical communications between a pair of endpoints 110 denoted as endpoint 110-A and endpoint 110-Z. The optical communications between endpoint 110-A and endpoint 110-Z may include a single optical signal (e.g., a single wavelength), multiple optical signals (e.g., multiple wavelengths, such as by using wavelength division multiplexing (WDM), dense WDM (DWDM), and so forth), or the like. The optical communications between endpoint 110-A and endpoint 110-Z include optical communications in a first direction of transmission from endpoint 110-A to endpoint 110-Z (which is left to right on the page and denoted herein as the GO direction) and optical communications in a second direction of transmission from endpoint 110-Z to endpoint 110-A (which is right to left on the page and denoted herein as the RETURN direction). The optical communications between endpoint 110-A and endpoint 110-Z are supported using a pair of submarine line terminal equipments (SLTEs) 112, disposed in the endpoints 110 (illustratively, the endpoint 110-A includes an SLTE 112-A and the endpoint 110-Z includes an SLTE 112-Z), which are configured to operate as transceivers of optical communications between the endpoints 110. The optical communications between the endpoint 110-A and the endpoint 110-Z are supported using a pair of optical paths 120 denoted as optical path 120-AZ from endpoint 110-A to endpoint 110-Z and optical path 120-ZA from endpoint 110-Z to endpoint 110-A. The optical paths 120 may be composed primarily of optical fibers configured to propagate optical signals.

In the optical communication system 100, the optical communications from the endpoint 110-A to the endpoint 110-Z in the GO direction use the optical path 120-AZ. The SLTE 112-A of endpoint 110-A transmits an optical signal 131-AZ over the optical path 120-AZ until the optical signal 131-AZ is received by the SLTE 112-Z of endpoint 110-Z. The optical path 120-AZ includes a ROPA 113-AZ. The ROPA 113-AZ is disposed on the receive side of the optical path 120-AZ, close to the endpoint 110-Z, for amplifying the optical signal 131-AZ before the optical signal 131-AZ reaches the SLTE 112-Z of the endpoint 110-Z. It will be appreciated that, based on the presence of the ROPA 113-AZ in the optical path 120-AZ, the optical fiber of the optical path 120-AZ may be considered to be an amplified fiber. The optical signal 131-AZ is received by the SLTE 112-Z of the endpoint 110-Z, where the optical signal 131-AZ may be propagated for further transmission, dropped for local propagation, or the like. It is noted that, for purposes of clarity, only the beginning and ending portions of the optical signal 131-AZ are marked in FIG. 1.

In the optical communication system 100, the optical communications from the endpoint 110-Z to the endpoint 110-A in the RETURN direction use the optical path 120-ZA. The SLTE 112-Z of endpoint 110-Z transmits an optical signal 131-ZA over the optical path 120-ZA until the optical signal 131-ZA is received by the SLTE 112-A of endpoint 110-A. The optical path 120-ZA includes a ROPA 113-ZA which is disposed on the receive side of the optical path 120-ZA, close to the endpoint 110-A, for amplifying the optical signal 131-ZA before the optical signal 131-ZA reaches the SLTE 112-A of the endpoint 110-A. It will be appreciated that the optical fiber of the optical path 120-ZA may be considered to be a non-amplified fiber. It will be appreciated that, although omitted for purposes of clarity, the optical path 120-ZA also could include a ROPA near the endpoint 110-A in the RETURN direction to amplify the optical signal 131-ZA. The optical signal 131-ZA is received by the SLTE 112-A of the endpoint 110-A, where the optical signal 131-ZA may be propagated for further transmission, dropped for local propagation, or the like. It is noted that, for purposes of clarity, only the beginning and ending portions of the optical signal 131-ZA are marked in FIG. 1.

The optical communication system 100 is configured to support monitoring functions for monitoring the health of various aspects of the optical communication system. The monitoring of the optical paths 120 between endpoint 110-A and endpoint 110-Z is supported using a pair of passive monitoring equipments (PMEs) 114, disposed in the endpoints 110 (illustratively, the endpoint 110-A includes a PME 114-A and the endpoint 110-Z includes a PME 114-Z), which are configured to insert optical supervisory signals into the optical paths 120, receive returning optical supervisory signals via the optical paths 120, and perform optical path health analysis functions based on analysis of the inserted optical supervisory signals and the returning optical supervisory signals. This may be used for detecting problems associated with the optical paths 120 in general, problems at particular locations along the optical paths 120, or the like, as well as various combinations thereof.

In the optical communication system 100, the optical path 120-AZ from the endpoint 110-A to the endpoint 110-Z may be monitored by the PME 114-A in the endpoint 110-A. The PME 114-A at endpoint 110-A is configured to insert optical supervisory signals into the optical path 120-AZ in the GO direction, receive returned versions of the optical supervisory signals received by the endpoint 110-A via the optical path 120-ZA in the RETURN direction, and analyze the inserted and returned optical supervisory signals for monitoring the health of various aspects of the optical path 120-AZ. For example, the PME 114-A may measure signal power levels of the optical supervisory signals to detect problems such as signal degradation problems, fiber cuts, component errors or failures, or the like.

In the optical communication system 100, the optical path 120-ZA from the endpoint 110-Z to the endpoint 110-A may be monitored by the PME 114-Z in the endpoint 110-Z. The PME 114-Z at endpoint 110-Z is configured to insert optical supervisory signals into the optical path 120-ZA in the RETURN direction, receive returned versions of the optical supervisory signals received by the endpoint 110-Z via the optical path 120-AZ in the GO direction, and analyze the inserted and returned optical supervisory signals for monitoring the health of various aspects of the optical path 120-ZA. For example, the PME 114-Z may measure signal power levels of the optical supervisory signals to detect problems such as signal degradation problems, fiber cuts, component errors or failures, or the like.

In the optical communication system 100, for the GO direction from the endpoint 110-A to the endpoint 110-Z, the endpoint 110-A is configured to insert optical signals onto the optical path 120-AZ and the endpoint 110-Z is configured to extract optical signals from the optical path 120-AZ. The endpoint 110-A includes a component 116-A that is configured to receive the optical signal 131-AZ from the SLTE 112-A and to receive monitoring signals (e.g., optical supervisory signals) from the PME 114-A, and to insert the optical signal 131-AZ from the SLTE 112-A and the monitoring signals from the PME 114-A onto the optical path 120-AZ in the GO direction. The endpoint 110-Z includes a component 118-Z that is configured to receive the optical signal 131-AZ (originated by the SLTE 112-A) and monitoring signals (e.g., originated by the PME 114-Z on the optical path 120-ZA in the RETURN direction and now being received back at the endpoint 110-Z via the optical path 120-AZ in the GO direction) via the optical path 120-AZ, and to provide the optical signal 131-AZ to the SLTE 114-Z and to provide the monitoring signals to the PME 114-Z (e.g., for analysis of the monitoring signals).

In the optical communication system 100, for the RETURN direction from the endpoint 110-Z to the endpoint 110-A, the endpoint 110-Z is configured to insert optical signals onto the optical path 120-ZA and the endpoint 110-A is configured to extract optical signals from the optical path 120-ZA. The endpoint 110-Z includes a component 116-Z that is configured to receive the optical signal 131-ZA from the SLTE 112-Z and to receive monitoring signals (e.g., optical supervisory signals) from the PME 114-Z, and to insert the optical signal 131-ZA from the SLTE 112-Z and the monitoring signals from the PME 114-Z onto the optical path 120-ZA in the RETURN direction. The endpoint 110-A includes a component 118-A that is configured to receive the optical signal 131-ZA (originated by the SLTE 112-Z) and monitoring signals (e.g., originated by the PME 114-A on the optical path 120-AZ in the GO direction and now being received back at the endpoint 110-A via the optical path 120-ZA in the RETURN direction) via the optical path 120-ZA, and to provide the optical signal 131-ZA to the SLTE 114-A and to provide the monitoring signals to the PME 114-A (e.g., for analysis of the monitoring signals).

In the optical communication system 100, the components 116 (e.g., components 116-A and 116-Z) and the components 118 (e.g., components 118-A and 118-Z) may include various types of components such as multiplexers, demultiplexers, wavelength selective switches (WSSs), WSSs with optical amplifiers (e.g., Erbium-doped fiber amplifiers (EDFAs) or other suitable types of amplifiers), WSS-type devices with or without optical amplifiers, or the like, as well as various combinations thereof.

The optical communication system 100 is configured to support remote monitoring of the optical path 120-AZ that includes the ROPA 113-AZ. The monitoring of the optical path 120-AZ that includes the ROPA 113-AZ is based on a pair of optical supervisory paths 140 and a pair of optical supervisory signals 150. It is noted that although, for purposes of clarity, only the portions of the optical supervisory signals 150 traversing the optical supervisory paths 140 are marked in FIG. 1, the optical supervisory signals 150 may be originated by the PME 114-A in the endpoint 110-A, propagated over the optical path 120-AZ in the GO direction, looped back from the optical path 120-AZ to the optical path 120-ZA based on the optical supervisory paths 140, propagated over the optical path 120-ZA in the RETURN direction, and received by the PME 114-A in the endpoint 110-A.

The optical supervisory paths 140 are optical loopback paths coupled from the optical path 120-AZ in the GO direction (e.g., the optical fiber with the ROPA 113-AZ in the GO direction) to the optical path 120-ZA in the RETURN direction (e.g., the optical fiber that is operated in the RETURN direction, which does not include an amplifier for the RETURN direction on the transmit side of the RETURN direction). The optical supervisory paths 140 are disposed around the ROPA 113-AZ. The optical supervisory paths 140 are considered to be disposed around the ROPA 113-AZ since the optical supervisory paths 140 include an optical supervisory path 140-1 at the input of the ROPA 113-AZ and an optical supervisory path 140-2 at the output of the ROPA 113-AZ.

The optical supervisory paths 140 are configured to couple the optical supervisory signals 150 from the optical path 120-AZ in the GO direction to the optical path 120-ZA in the RETURN direction. The optical supervisory paths 140 are configured to extract the optical supervisory signals 150 from the optical path 120-AZ in the GO direction and insert the optical supervisory signals 150 into the optical path 120-ZA in the RETURN direction. The optical supervisory paths 140 are wavelength selective paths which are configured to extract optical supervisory signals 150 from the optical path 120-AZ based on the wavelengths of the optical supervisory signals 150. The optical supervisory paths 140 are configured to insert the optical supervisory signals 150 into the optical path 120-ZA for return, along with the optical signal 141-ZA, to the PME 114-A of the endpoint 110-A via the optical path 120-ZA.

The optical supervisory signals 150 are controlled and analyzed by the PME 114-A on the endpoint 110-A for monitoring the optical path 120-AZ that includes the ROPA 113-AZ. The PME 114-A inserts the optical supervisory signals 150 into the optical path 120-AZ in the GO direction. The PME 114-A monitors for the optical supervisory signals 150 on the optical path 120-ZA received by the PME 114-A in the RETURN direction. The optical supervisory signals 150 include an optical supervisory signal 150-1 that is coupled from the optical path 120-AZ to the optical path 120-ZA based on the optical supervisory path 140-1 (illustratively, at or near the input to the ROPA 113-AZ, e.g., for use in measuring the input signal level at the input to the ROPA 113-AZ) and an optical supervisory signal 150-2 that is coupled from the optical path 120-AZ to the optical path 120-ZA based on the optical supervisory path 140-2 (illustratively, at or near the output of the ROPA 113-AZ, e.g., for use in measuring the output signal level at the output of the ROPA 113-AZ).

The optical supervisory signals 150 are out of the signal band of the optical signals transported on the optical paths 120 (which may be referred to as in-band signals). The optical supervisory signals 150 use different wavelengths. The optical supervisory signal 150-1 uses wavelength $\lambda_2$ and the optical supervisory signal 150-2 uses wavelength $\lambda_1$, and the optical supervisory path 140-1 at the input of the ROPA 113-AZ is configured to extract the optical supervisory signal 150-1 at wavelength $\lambda_2$ and the optical supervisory path 140-2 at the output of the ROPA 113-AZ is configured to extract the optical supervisory signal 150-2 at wavelength $\lambda_1$. It will be appreciated that, although primarily presented with respect to optical supervisory signals 150 that are asymmetrical (i.e., different wavelengths $\lambda_1$ and $\lambda_2$ are used for the optical supervisory signals 150), the optical supervisory signals 150 may be symmetrical (i.e., a common wavelength $\lambda$ may be used for the optical supervisory signals 150, in which case the timing of various aspects of the optical supervisory signals may be controlled for supporting proper propagation and analysis of the optical supervisory signals).

The optical supervisory paths 140 may be composed of a set of elements configured to provide the functions of the optical supervisory paths 140 (e.g., to extract the optical supervisory signals 150 from the optical path 120-AZ in the GO direction and insert the supervisory signals 150 into the optical path 120-ZA in the RETURN direction). The elements may include couplers such as optical couplers, reflectors such as optical reflectors, transmission filters such as optical transmission filters (e.g., multiplexers and demultiplexers), or the like, as well as various combinations thereof. The elements may be combined in various ways (e.g., in terms of the types of elements, numbers of elements, or the like), arranged in various ways, or the like, as well as various combinations thereof. It will be appreciated that, although depicted as separate paths for purposes of clarity, portions of the optical supervisory paths 140-1 and 140-2 may share common elements.

The optical supervisory paths 140 may be composed of a set of elements configured to provide the functions of the optical supervisory paths 140, where the set of elements may include a first set of one or more elements (which also may be referred to as one or more first elements) configured to extract the optical supervisory signal 150-1 from the optical path 120-AZ at the input of the ROPA 113-AZ, a second set of one or more elements (which also may be referred to as one or more second elements) configured to extract the optical supervisory signal 150-2 from the optical path 120-AZ at the output of the ROPA 113-AZ, and a third set of one or more elements (which also may be referred to as one or more third elements) configured to insert the optical supervisory signal 150-1 and the optical supervisory signal 150-2 into the optical path 120-ZA in the RETURN direction. The one or more first elements may include one or more couplers, one or more transmission filters, one or more reflectors, a combination of a coupler and a transmission filter, a combination of a reflector and a coupler, a combination of a transmission filter and a coupler, or the like, as well as various combinations thereof. The one or more second elements may include one or more couplers, one or more transmission filters, one or more reflectors, a combination of a coupler and a transmission filter, a combination of a reflector and a coupler, a combination of a transmission filter and a coupler, or the like, as well as various combinations thereof. The one or more third elements may include one or more couplers, one or more transmission filters, one or more reflectors, a combination of a coupler and a transmission filter, or the like, as well as various combinations thereof. It will be appreciated that various example embodiments may use various combinations of elements in the first set of elements, the second set of elements, and/or the third set of elements to provide the functions of the optical supervisory paths 140.

It will be appreciated that various example embodiments for providing the functions of the optical supervisory paths 140 based on one or more elements may be further understood by way of reference to the example embodiments of FIGS. 2-5.

It will be appreciated that, although the optical communication system 100 is depicted as including a ROPA in the GO direction on the receive side of the optical path (illustratively, in the optical path 120-AZ near the endpoint 110-Z), in at least some example embodiments the optical communication system 100 also or alternatively may include a ROPA in the RETURN direction on the receive side of the optical path (namely, in the optical path 120-ZA near the endpoint 110-A).

In at least some example embodiments, in which the optical communication system 100 instead includes a ROPA in the RETURN direction on the receive side of the optical path, the associated optical supervisory signals may be symmetrical (e.g., using the wavelength $\lambda$) or asymmetrical (e.g., using the wavelengths $\lambda_1$ and $\lambda_2$). It is noted that symmetrical optical supervisory signals may be used by controlling the timing of various aspects of the optical supervisory signals (e.g., in order to support proper propagation and analysis of the optical supervisory signals).

In at least some example embodiments, in which the optical communication system 100 includes both the ROPA 113-AZ in the GO direction on the receive side of the optical path 120-AZ and a second ROPA in the RETURN direction on the receive side of the optical path 120-ZA), the associated optical supervisory signals may be configured in various ways. In at least some example embodiments, the associated pairs of optical supervisory wavelengths may be symmetrical (e.g., using the wavelengths $\lambda_1$ and $\lambda_2$ for the optical supervisory signals of each of the ROPAs) or asymmetrical (e.g., using wavelengths $\lambda_1$ and $\lambda_2$ for the optical supervisory signals of one of the ROPAs and using wavelengths $\lambda_3$ and $\lambda_4$ for the optical supervisory signals of the other of the ROPAs). It is noted that symmetrical optical supervisory signals may be used by controlling the timing of various aspects of the optical supervisory signals (e.g., so that the optical supervisory signals that are introduced in one direction are not filtered out in the other direction).

It will be appreciated that the optical supervisory paths 140 used for extracting the optical supervisory signals 150 from around the ROPA 113-AZ on the GO path and inserting the optical supervisory signals 150 into the RETURN path may be supported using various other numbers, types, or arrangements of elements. For example, various other numbers or arrangements of couplers, reflectors, and/or transmission filters may be used for extracting the optical supervisory signals 150 from around the ROPA 113-AZ on the GO path and inserting the optical supervisory signals 150 into the RETURN path. For example, either or both of the optical supervisory paths 140 may include one or more attenuators in order to achieve desired loss on the optical supervisory paths. It will be appreciated that the optical supervisory paths 140 used for extracting the optical supervisory signals 150 from around the ROPA 113-AZ on the GO path and inserting the optical supervisory signals 150 into the RETURN path may be supported using various other numbers, types, or arrangements of elements.

It will be appreciated that the optical communication system 100, although presented as including specific numbers, types, and arrangements of elements, may include various other numbers, types, or arrangements of elements.

Figure 2:
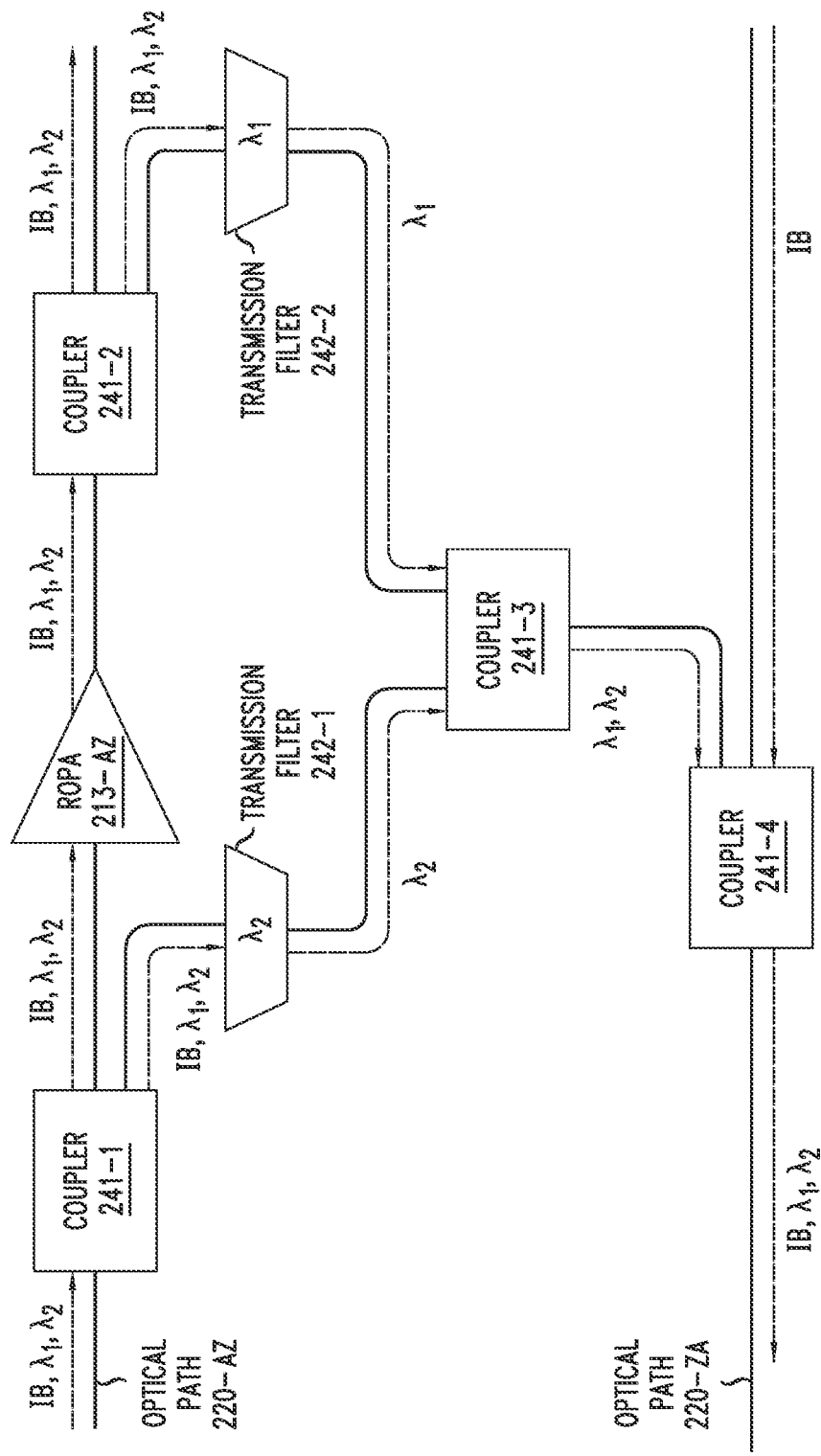
FIG. 2 depicts an example embodiment of a set of elements configured to provide a set of optical supervisory paths for a ROPA based on use of couplers and transmission filters.

FIG. 2 depicts an example embodiment of a set of elements configured to provide a set of optical supervisory paths for a ROPA based on use of couplers and transmission filters.

It will be appreciated that FIG. 2 depicts a portion of FIG. 1, including an optical path 220-AZ (in the GO direction) that includes a ROPA 213-AZ and an optical path 220-ZA (in the RETURN direction), where the optical paths 220 correspond to the optical paths 120 of FIG. 1 and the ROPA 213-AZ corresponds to the ROPA 113-AZ of FIG. 1, respectively.

The optical supervisory paths include a first optical supervisory path and a second optical supervisory path. The first optical supervisory path connects the optical path 220-AZ at the input to the ROPA 213-AZ to the optical path 220-ZA and is configured to support an optical supervisory signal $\lambda_2$ (e.g., extracting the optical supervisory signal $\lambda_2$ from the optical path 220-AZ and inserting the optical supervisory signal $\lambda_2$ into the optical path 220-ZA). The second optical supervisory path connects the optical path 220-AZ at the output of the ROPA 213-AZ to the optical path 220-ZA and is configured to support an optical supervisory signal $\lambda_1$ (e.g., extracting the optical supervisory signal $\lambda_1$ from the optical path 220-AZ and inserting the optical supervisory signal $\lambda_1$ into the optical path 220-ZA).

The first optical supervisory path, which connects the optical path 220-AZ at the input to the ROPA 213-AZ to the optical path 220-ZA, includes a coupler 241-1, a transmission filter 242-1, a coupler 241-3, and a coupler 241-4. The second optical supervisory path, which connects the optical path 220-AZ at the output of the ROPA 213-AZ to the optical path 220-ZA, includes a coupler 241-2, a transmission filter 242-2, the coupler 241-3, and the coupler 241-4. It will be appreciated that the first optical supervisory path and the second optical supervisory path share the coupler 241-3 and the coupler 241-4.

The optical path 220-AZ includes the coupler 241-1, the ROPA 213-AZ, and the coupler 241-2. The optical path 220-AZ transports the in-band signal IB, as well as the optical supervisory signals ($\lambda_2,\lambda_1$), in the GO direction. The coupler 241-1 receives the in-band signal IB and the optical supervisory signals ($\lambda_2,\lambda_1$) and passes the in-band signal IB and the optical supervisory signals ($\lambda_2,\lambda_1$) to the ROPA 213-AZ. The ROPA 213-AZ receives the in-band signal IB and the optical supervisory signals ($\lambda_2,\lambda_1$), amplifies the in-band signal IB and the optical supervisory signals ($\lambda_2,\lambda_1$), and provides the amplified in-band signal IB and the amplified optical supervisory signals ($\lambda_2,\lambda_1$) to the coupler 241-2. The coupler 241-2 receives the amplified in-band signal IB and the amplified optical supervisory signals ($\lambda_2,\lambda_1$) and passes the amplified in-band signal IB and the amplified optical supervisory signals ($\lambda_2,\lambda_1$) along the optical path 220-AZ.

The first optical supervisory path connects the optical path 220-AZ at the input to the ROPA 213-AZ to the optical path 220-ZA. The coupler 241-1 receives the signals of the optical path 220-AZ (namely, the in-band signal IB as well as the optical supervisory signals ($\lambda_2,\lambda_1$)) and provides the signals of the optical path 220-AZ (again, the in-band signal IB as well as the optical supervisory signals ($\lambda_2,\lambda_1$)) to the transmission filter 242-1. The transmission filter 242-1 filters out the in-band signal IB and the optical supervisory signal $\lambda_1$ for the second optical supervisory path so that only the optical supervisory signal $\lambda_2$ remains in the first optical supervisory path. The optical supervisory signal $\lambda_2$ is input to the coupler 241-3 to be combined with the optical supervisory signal $\lambda_1$ from the second optical supervisory path.

The second optical supervisory path connects the optical path 220-AZ at the output of the ROPA 213-AZ to the optical path 220-ZA. The coupler 241-2 receives the amplified signals of the optical path 220-AZ from the ROPA 213-AZ (namely, the amplified in-band signal IB as well as the amplified optical supervisory signals ($\lambda_2,\lambda_1$)) and provides the amplified signals of the optical path 220-AZ (again, the amplified in-band signal IB as well as the amplified optical supervisory signals ($\lambda_2,\lambda_1$)) to the transmission filter 242-2. The transmission filter 242-2 filters out the in-band signal IB and the optical supervisory signal $\lambda_2$ for the first optical supervisory path so that only the optical supervisory signal $\lambda_1$ remains in the second optical supervisory path. The optical supervisory signal $\lambda_1$ is input to the coupler 241-3 to be combined with the optical supervisory signal $\lambda_2$ from the first optical supervisory path.

The first optical supervisory path and the second optical supervisory path are connected to the optical path 220-ZA in the RETURN direction through the coupler 241-3 and the coupler 241-4. The coupler 241-3 receives the optical supervisory signal $\lambda_2$ of the first optical supervisory path and the optical supervisory signal $\lambda_1$ of the second optical supervisory path and combines the optical supervisory signal $\lambda_2$ of the first optical supervisory path and the optical supervisory signal $\lambda_1$ of the second optical supervisory path. The coupler 241-4 receives the optical supervisory signals ($\lambda_2,\lambda_1$) of the first and second optical supervisory paths and combines the optical supervisory signals ($\lambda_2,\lambda_1$) of the first and second optical supervisory paths with the in-band signal IB propagating in the RETURN direction (which, it will be appreciated, may be different than the in-band signal IB propagating in the GO direction). In this manner, the optical supervisory signals ($\lambda_2,\lambda_1$) are inserted into the optical path 220-ZA. It will be appreciated that, although omitted for purposes of clarity, the coupler 241-4 could be replaced with a transmission filter (e.g., a wavelength selective multiplexer) or other suitable element(s).

It will be appreciated that the optical supervisory paths used for extracting the optical supervisory signals ($\lambda_2,\lambda_1$) from around the ROPA 213-AZ on the GO path and inserting the optical supervisory signals ($\lambda_2,\lambda_1$) into the RETURN path may be supported using various other numbers, types, or arrangements of elements.

Figure 3:
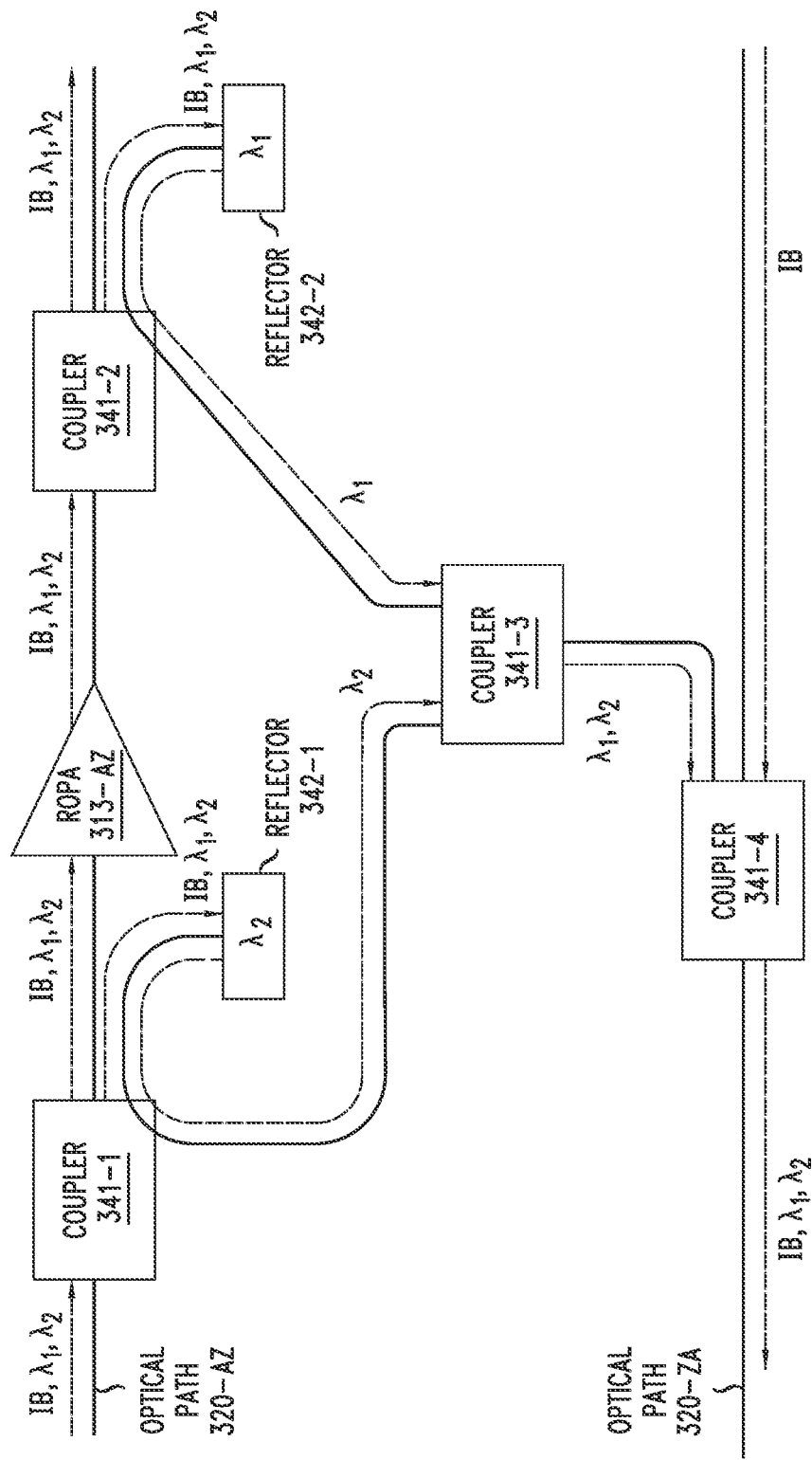
FIG. 3 depicts an example embodiment of a set of elements configured to provide a set of optical supervisory paths for a ROPA based on use of reflectors and couplers.

FIG. 3 depicts an example embodiment of a set of elements configured to provide a set of optical supervisory paths for a ROPA based on use of repeaters and couplers.

It will be appreciated that FIG. 3 depicts a portion of FIG. 1, including an optical path 320-AZ (in the GO direction) that includes a ROPA 313-AZ and an optical path 320-ZA (in the RETURN direction), where the optical paths 320 correspond to the optical paths 120 of FIG. 1 and the ROPA 313-AZ corresponds to the ROPA 113-AZ of FIG. 1, respectively.

The optical supervisory paths include a first optical supervisory path and a second optical supervisory path. The first optical supervisory path connects the optical path 320-AZ at the input to the ROPA 313-AZ to the optical path 320-ZA and is configured to support an optical supervisory signal $\lambda_2$ (e.g., extracting the optical supervisory signal $\lambda_2$ from the optical path 320-AZ and inserting the optical supervisory signal $\lambda_2$ into the optical path 320-ZA). The second optical supervisory path connects the optical path 320-AZ at the output of the ROPA 313-AZ to the optical path 320-ZA and is configured to support an optical supervisory signal $\lambda_1$ (e.g., extracting the optical supervisory signal $\lambda_1$ from the optical path 320-AZ and inserting the optical supervisory signal $\lambda_1$ into the optical path 320-ZA).

The first optical supervisory path, which connects the optical path 320-AZ at the input to the ROPA 313-AZ to the optical path 320-ZA, includes a coupler 341-1, a reflector 342-1, a coupler 341-3, and a coupler 341-4. The second optical supervisory path, which connects the optical path 320-AZ at the output of the ROPA 313-AZ to the optical path 320-ZA, includes a coupler 341-2, a reflector 342-2, the coupler 243-3, and the coupler 243-4. It will be appreciated that the first optical supervisory path and the second optical supervisory path share the coupler 341-3 and the coupler 341-4.

The optical path 320-AZ includes the coupler 341-1, the ROPA 313-AZ, and the coupler 341-2. The optical path 320-AZ transports the in-band signal IB, as well as the optical supervisory signals ($\lambda_2,\lambda_1$), in the GO direction. The coupler 341-1 receives the in-band signal IB and the optical supervisory signals ($\lambda_2,\lambda_1$) and passes the in-band signal IB and the optical supervisory signals ($\lambda_2,\lambda_1$) to the ROPA 313-AZ. The ROPA 313-AZ receives the in-band signal IB and the optical supervisory signals ($\lambda_2,\lambda_1$), amplifies the in-band signal IB and the optical supervisory signals ($\lambda_2,\lambda_1$), and provides the amplified in-band signal IB and the amplified optical supervisory signals ($\lambda_2,\lambda_1$) to the coupler 341-2. The coupler 341-2 receives the amplified in-band signal IB and the amplified optical supervisory signals ($\lambda_2,\lambda_1$) and passes the amplified in-band signal IB and the amplified optical supervisory signals ($\lambda_2,\lambda_1$) along the optical path 320-AZ.

The first optical supervisory path connects the optical path 320-AZ at the input to the ROPA 313-AZ to the optical path 320-ZA. The coupler 341-1 receives the signals of the optical path 220-AZ (namely, the in-band signal IB as well as the optical supervisory signals ($\lambda_2,\lambda_1$)) and provides the signals of the optical path 320-AZ (again, the in-band signal IB as well as the optical supervisory signals ($\lambda_2,\lambda_1$)) to the reflector 342-1. The reflector 342-1 reflects the optical supervisory signal $\lambda_2$ for the first optical supervisory path, thereby removing the in-band signal IB and the optical supervisory signal $\lambda_1$ for the second optical supervisory path so that only the optical supervisory signal $\lambda_2$ remains in the first optical supervisory path. The optical supervisory signal $\lambda_2$ is input to the coupler 341-3 to be combined with the optical supervisory signal $\lambda_1$ from the second optical supervisory path.

The second optical supervisory path connects the optical path 320-AZ at the output of the ROPA 313-AZ to the optical path 320-ZA. The coupler 341-2 receives the amplified signals of the optical path 320-AZ from the ROPA 313-AZ (namely, the amplified in-band signal IB as well as the amplified optical supervisory signals ($\lambda_2,\lambda_1$)) and provides the amplified signals of the optical path 320-AZ (again, the amplified in-band signal IB as well as the amplified optical supervisory signals ($\lambda_2,\lambda_1$)) to the reflector 342-2. The reflector 342-2 reflects the optical supervisory signal $\lambda_1$ for the second optical supervisory path, thereby removing the in-band signal IB and the optical supervisory signal $\lambda_2$ for the first optical supervisory path so that only the optical supervisory signal $\lambda_1$ remains in the second optical supervisory path. The optical supervisory signal $\lambda_1$ is input to the coupler 341-3 to be combined with the optical supervisory signal $\lambda_2$ from the first optical supervisory path.

The first optical supervisory path and the second optical supervisory path are connected to the optical path 320-ZA in the RETURN direction through the coupler 341-3 and the coupler 341-4. The coupler 341-3 receives the optical supervisory signal $\lambda_2$ of the first optical supervisory path and the optical supervisory signal $\lambda_1$ of the second optical supervisory path and combines the optical supervisory signal $\lambda_2$ of the first optical supervisory path and the optical supervisory signal $\lambda_1$ of the second optical supervisory path. The coupler 341-4 receives the optical supervisory signals ($\lambda_2, \lambda_1$) of the first and second optical supervisory paths and combines the optical supervisory signals ($\lambda_2, \lambda_1$) of the first and second optical supervisory paths with the in-band signal IB propagating in the RETURN direction (which, it will be appreciated, may be different than the in-band signal IB propagating in the GO direction). In this manner, the optical supervisory signals ($\lambda_2, \lambda_1$) are inserted into the optical path 320-ZA. It will be appreciated that, although omitted for purposes of clarity, the coupler 341-4 could be replaced with a transmission filter (e.g., a wavelength selective multiplexer) or other suitable element(s).

It will be appreciated that the optical supervisory paths used for extracting the optical supervisory signals ($\lambda_2, \lambda_1$) from around the ROPA 313-AZ on the GO path and inserting the optical supervisory signals ($\lambda_2, \lambda_1$) into the RETURN path may be supported using various other numbers, types, or arrangements of elements.

Figure 4:
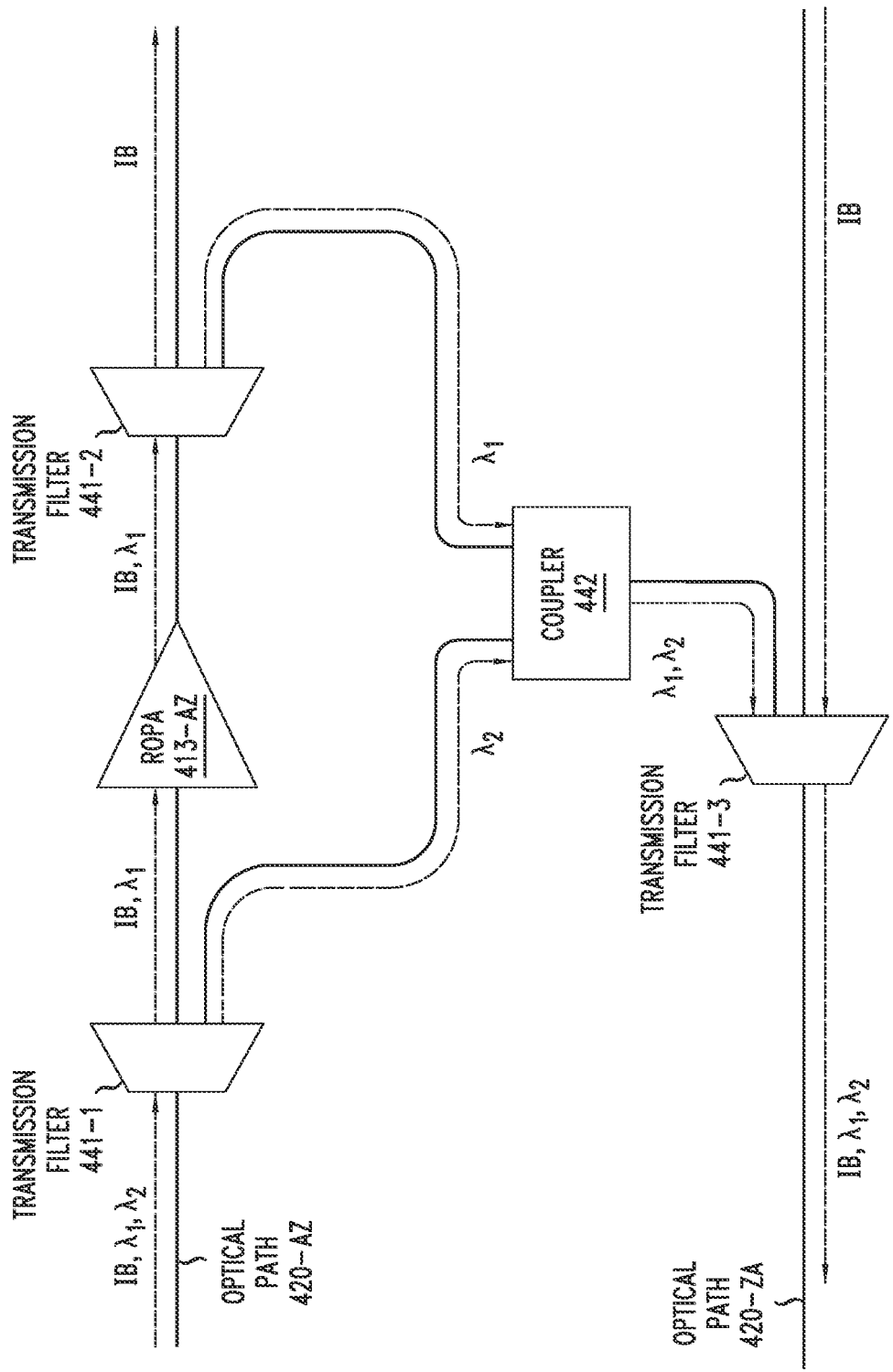
FIG. 4 depicts an example embodiment of a set of elements configured to provide a set of optical supervisory paths for a ROPA based on use of transmission filters and couplers.

FIG. 4 depicts an example embodiment of a set of elements configured to provide a set of optical supervisory paths for a ROPA based on use of transmission filters and couplers.

It will be appreciated that FIG. 4 depicts a portion of FIG. 1, including an optical path 420-AZ (in the GO direction) that includes a ROPA 413-AZ and an optical path 420-ZA (in the RETURN direction), where the optical paths 420 correspond to the optical paths 120 of FIG. 1 and the ROPA 413-AZ corresponds to the ROPA 113-AZ of FIG. 1, respectively.

The optical supervisory paths include a first optical supervisory path and a second optical supervisory path. The first optical supervisory path connects the optical path 420-AZ at the input to the ROPA 413-AZ to the optical path 420-ZA and is configured to support an optical supervisory signal $\lambda_2$ (e.g., extracting the optical supervisory signal $\lambda_2$ from the optical path 420-AZ and inserting the optical supervisory signal $\lambda_2$ into the optical path 420-ZA). The second optical supervisory path connects the optical path 420-AZ at the output of the ROPA 413-AZ to the optical path 420-ZA and is configured to support an optical supervisory signal $\lambda_1$ (e.g., extracting the optical supervisory signal $\lambda_1$ from the optical path 420-AZ and inserting the optical supervisory signal $\lambda_1$ into the optical path 420-ZA).

The first optical supervisory path, which connects the optical path 420-AZ at the input to the ROPA 213-AZ to the optical path 420-ZA, includes a transmission filter 441-1, a coupler 442, and a transmission filter 441-3. The second optical supervisory path, which connects the optical path 420-AZ at the output of the ROPA 413-AZ to the optical path 420-ZA, includes a transmission filter 441-2, the coupler 442, and the transmission filter 441-3. It will be appreciated that the first optical supervisory path and the second optical supervisory path share the coupler 442 and the transmission filter 441-3.

The optical path 420-AZ includes the transmission filter 441-1, the ROPA 413-AZ, and the transmission filter 441-2. The optical path 420-AZ transports the in-band signal IB, as well as the optical supervisory signals ($\lambda_2, \lambda_1$) along portions of the optical path 420-AZ, in the GO direction. The transmission filter 441-1 receives the in-band signal IB and the optical supervisory signals ($\lambda_2, \lambda_1$), and passes the in-band signal IB and the optical supervisory signal $\lambda_1$ to the ROPA 413-AZ while filtering the optical supervisory signal $\lambda_2$ such that the optical supervisory signal $\lambda_2$ is not provided to the ROPA 413-AZ. The ROPA 413-AZ receives the in-band signal IB and the optical supervisory signal $\lambda_1$, amplifies the in-band signal IB and the optical supervisory signal $\lambda_1$, and provides the amplified in-band signal IB and the amplified optical supervisory signal $\lambda_1$ to the transmission filter 441-2. The transmission filter 441-2 receives the amplified in-band signal IB and the amplified optical supervisory signal $\lambda_1$, and passes the amplified in-band signal IB while filtering the amplified optical supervisory signal $\lambda_1$ such that the optical supervisory signal $\lambda_1$ is no longer propagated along the optical path 420-AZ.

The first optical supervisory path connects the optical path 420-AZ at the input to the ROPA 413-AZ to the optical path 420-ZA. The transmission filter 441-1 receives the signals of the optical path 420-AZ (namely, the in-band signal IB as well as the optical supervisory signals ($\lambda_2, \lambda_1$)), and passes the in-band signal IB and the optical supervisory signal $\lambda_1$ to the ROPA 413-AZ while filtering out the optical supervisory signal $\lambda_2$ (e.g., based on demultiplexing where the transmission filter 441-1 is a demultiplexer) and providing the optical supervisory signal $\lambda_2$ to the coupler 442. The optical supervisory signal $\lambda_2$ is input to the coupler 442 to be combined with the optical supervisory signal $\lambda_1$ from the second optical supervisory path.

The second optical supervisory path connects the optical path 420-AZ at the output of the ROPA 413-AZ to the optical path 420-ZA. The transmission filter 441-2 receives the amplified signals output by the ROPA 413-AZ (namely, the amplified in-band signal IB as well as the amplified optical supervisory signal $\lambda_1$), and passes the amplified in-band signal IB along the optical path 420-AZ while filtering out the amplified optical supervisory signal $\lambda_1$ (e.g., based on demultiplexing where the transmission filter 441-21 is a demultiplexer) and providing the amplified optical supervisory signal $\lambda_1$ to the coupler 442. The optical supervisory signal $\lambda_1$ is input to the coupler 442 to be combined with the optical supervisory signal $\lambda_2$ from the first optical supervisory path.

The first optical supervisory path and the second optical supervisory path are connected to the optical path 420-ZA in the RETURN direction through the coupler 442 and the transmission filter 441-3. The coupler 442 receives the optical supervisory signal $\lambda_2$ of the first optical supervisory path and the optical supervisory signal $\lambda_1$ of the second optical supervisory path and combines the optical supervisory signal $\lambda_2$ of the first optical supervisory path and the optical supervisory signal $\lambda_1$ of the second optical supervisory path. The transmission filter 441-3 receives the optical supervisory signals ($\lambda_2, \lambda_1$) of the first and second optical supervisory paths and combines the optical supervisory signals ($\lambda_2, \lambda_1$) of the first and second optical supervisory paths with the in-band signal IB propagating in the RETURN direction (which, it will be appreciated, may be different than the in-band signal IB propagating in the GO direction). It will be appreciated that the combination of the optical supervisory signals ($\lambda_2, \lambda_1$) of the first and second optical supervisory paths with the in-band signal IB propagating in the RETURN direction may be based on multiplexing where the transmission filter 441-3 is a multiplexer. In this manner, the optical supervisory signals ($\lambda_2, \lambda_1$) are inserted into the optical path 420-ZA. It will be appreciated that, although omitted for purposes of clarity, the coupler 442 could be replaced with a transmission filter (e.g., a wavelength selective multiplexer) or other suitable element(s).

It will be appreciated that the optical supervisory paths used for extracting the optical supervisory signals ($\lambda_2, \lambda_1$) from around the ROPA 413-AZ on the GO path and inserting the optical supervisory signals ($\lambda_2, \lambda_1$) into the RETURN path may be supported using various other numbers, types, or arrangements of elements.

It will be appreciated that, although primarily presented in FIGS. 2-4 with respect to use of specific numbers, types, and arrangements of elements for providing the optical supervisory paths for supporting extraction of optical supervisory signals from around a ROPA in one optical signal path direction and insertion of the optical supervisory signals into the other optical signal path direction, various other numbers, types, and/or arrangements of elements may be used for providing the optical supervisory paths for supporting extraction of optical supervisory signals from around a ROPA in one optical signal path direction and insertion of the optical supervisory signals into the other optical signal path direction (e.g., coupler 241-4 could be replaced with a transmission filter, coupler 341-4 could be replaced with a transmission filter, coupler 442 and transmission filter 441-3 could be replaced with a 3-input transmission filter, or the like, as well as various combinations thereof).

Figure 5:
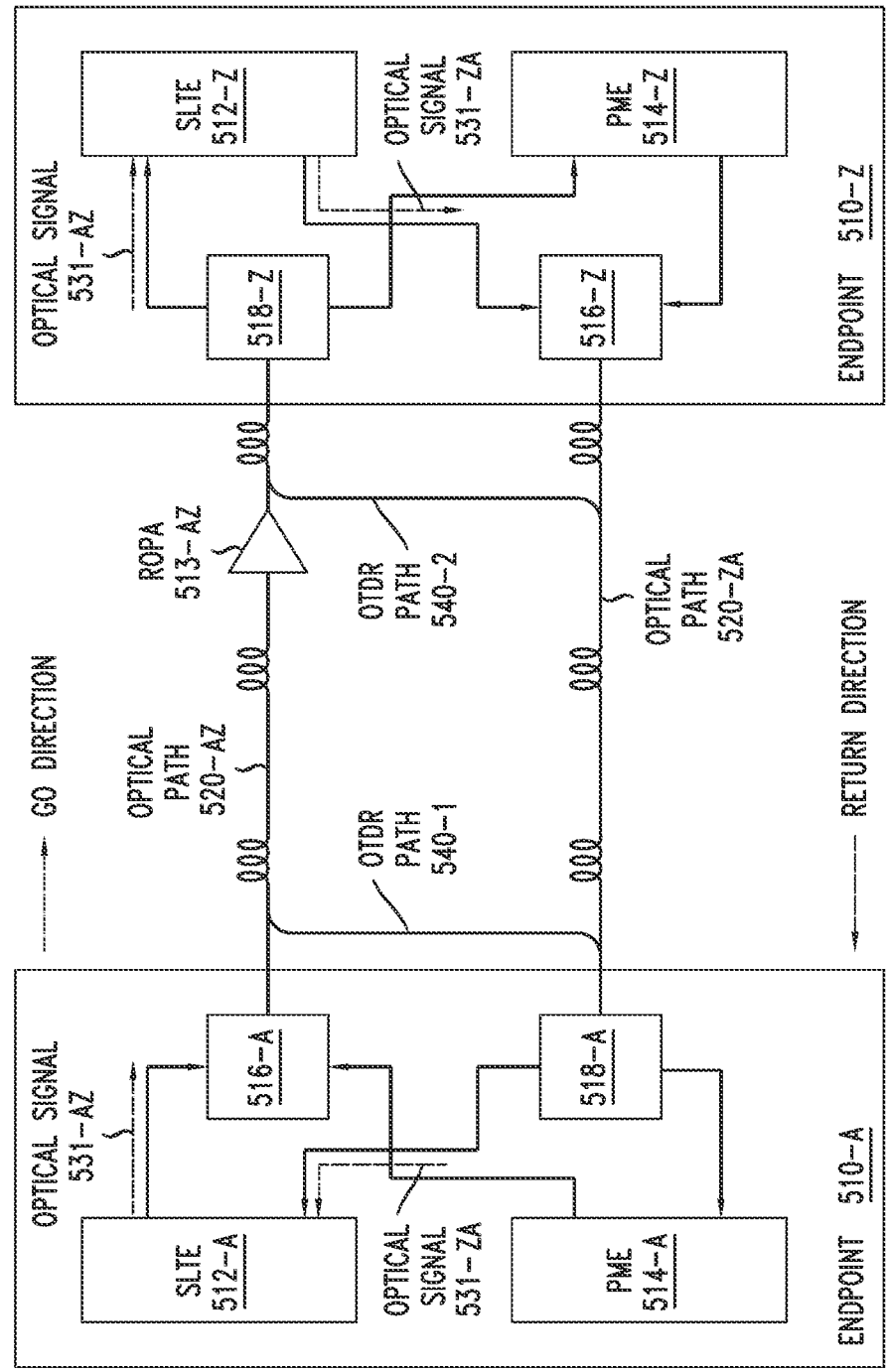
FIG. 5 depicts an example embodiment of an optical communication system including an optical path including a ROPA and configured to support supervision of the optical path including the ROPA based on a pair of optical time-domain reflectometer (OTDR) paths.

FIG. 5 depicts an example embodiment of an optical communication system including an optical path including a ROPA and configured to support supervision of the optical path including the ROPA based on a pair of OTDR paths.

The optical communication system 500 is configured to support optical communications between a pair of endpoints 510 denoted as endpoint 510-A and endpoint 510-Z. The optical communications may include a single optical signal (e.g., a single wavelength), multiple optical signals (e.g., multiple wavelengths), or the like. The optical communications may include wave length division multiplexing (WDM) communications, dense wavelength division multiplexing (DWDM) multiplexing, or the like. The optical communications may be supported in various communications contexts, such as for optical submarine transmission systems which may operate as the backbones of international transmission networks, optical distribution networks supporting fiber to the home, or the like. It will be appreciated that, although primarily presented herein within the context of providing supervisory signals for ROPAs in a particular type of optical communication system (namely, an optical submarine transmission system), various example embodiments presented herein may be used for providing supervisory signals for ROPAs in other types of optical communication systems.

In the optical communications system 500, the optical communications between endpoint 510-A and endpoint 510-Z include optical communications in a first direction of transmission from endpoint 510-A to endpoint 510-Z (which is left to right on the page and is denoted herein as the GO direction) and optical communications in a second direction of transmission from endpoint 510-Z to endpoint 510-A (which is right to left on the page and is denoted herein as the RETURN direction). The optical communications between endpoint 510-A and endpoint 510-Z are supported using a pair of SLTEs 512, disposed in the endpoints 510 (illustratively, the endpoint 510-A includes an SLTE 512-A and the endpoint 510-Z includes an SLTE 512-Z), which are configured to operate as transceivers of optical communications between the endpoints 510. The optical communications between the endpoint 510-A and the endpoint 510-Z are supported using a pair of optical paths 520 denoted as optical path 520-AZ from endpoint 510-A to endpoint 510-Z and optical path 520-ZA from endpoint 510-Z to endpoint 510-A. The optical paths 520 may be composed primarily of optical fibers configured to propagate optical signals.

In the optical communication system 500, the optical communications from endpoint 510-A to endpoint 510-Z in the GO direction use the optical path 520-AZ. The SLTE 512-A of endpoint 510-A transmits an optical signal 531-AZ over the optical path 520-AZ until the optical signal 531-AZ is received by the SLTE 512-Z of endpoint 510-Z. The optical path 520-AZ includes a ROPA 513-AZ which is disposed on the receive side of the optical path 520-AZ, close to the endpoint 510-Z, for amplifying the optical signal 531-AZ before the optical signal 531-AZ reaches the SLTE 512-Z of the endpoint 510-Z. It will be appreciated that, based on the presence of the ROPA 513-AZ in the optical path 520-AZ, the optical fiber of the optical path 520-AZ may be considered to be an amplified fiber. The optical signal 531-AZ is received by the SLTE 512-Z of the endpoint 510-Z, where the optical signal 531-AZ may be further propagated for long distance transmission, dropped for local propagation, or the like. It is noted that, for purposes of clarity, only portions of the optical signal 531-AZ are presented in FIG. 5.

In the optical communication system 500, the optical communications from endpoint 510-Z to endpoint 510-A in the RETURN direction use the optical path 520-ZA. The SLTE 512-Z of endpoint 510-Z transmits an optical signal 531-ZA over the optical path 520-ZA until the optical signal 531-ZA is received by the SLTE 512-A of endpoint 510-A. It will be appreciated that the optical fiber of the optical path 520-ZA may be considered to be a non-amplified fiber. It will be appreciated that, although omitted for purposes of clarity, the optical path 520-ZA also could include a ROPA near the endpoint 510-A in the RETURN direction to amplify the optical signal 531-ZA The optical signal 531-ZA is received by the SLTE 512-A of the endpoint 510-A, where the optical signal 531-ZA may be further propagated for long distance transmission, dropped for local propagation, or the like. It is noted that, for purposes of clarity, only portions of the optical signal 531-ZA are presented in FIG. 5.

The optical communication system 500 is configured to support monitoring functions for monitoring the health of various aspects of the optical communication system. The monitoring of the optical paths 520 between endpoint 510-A and endpoint 510-Z is supported using a pair of PMEs 514, disposed in the endpoints 510 (illustratively, the endpoint 510-A includes a PME 514-A and the endpoint 510-Z includes a PME 514-Z), which are configured to insert OTDR signals into the optical paths 520, receive reflected OTDR signals via the optical paths 520, and perform optical path health analysis functions based on analysis of the inserted OTDR signals and the reflected OTDR signals. This may be used for detecting problems associated with the optical paths 520 in general, problems at particular locations along the optical paths 520, or the like, as well as various combinations thereof.

In the optical communication system 500, the optical path 520-AZ from the endpoint 510-A to the endpoint 510-Z may be monitored by the PME 514-A in the endpoint 510-A. The PME 510-A at endpoint 510-A is configured to insert OTDR signals into the optical path 520-AZ in the GO direction, receive reflected versions of the OTDR signals (in the example of FIG. 5, via either of the optical paths 520 where reflection occurs before the ROPA 513-AZ on the optical path 520-AZ or via the optical path 520-ZA where the reflection occurs after the ROPA 513-AZ on the optical path 520-AZ since the ROPA 513-AZ will prevent propagation of the reflected OTDR signal along the optical path 520-AZ toward the endpoint 510-A), and analyze the inserted and reflected OTDR signals for monitoring the health of various aspects of the optical path 520-AZ. For example, the PME 514-A may detect problems (e.g., signal degradation problems, fiber cuts, component errors or failures, or the like) based on analysis of the paths via which the reflected OTDR signals are received, signal power levels of the OTDR signals, or the like, as well as various combinations thereof.

In the optical communication system 500, the optical path 520-ZA from the endpoint 510-Z to the endpoint 510-A may be monitored by the PME 514-Z in the endpoint 510-Z. The PME 510-Z at endpoint 510-Z is configured to insert OTDR signals into the optical path 520-ZA in the RETURN direction, receive reflected versions of the OTDR signals (in the example of FIG. 5, via the optical path 520-ZA since the optical path 520-ZA does not include a ROPA that would otherwise prevent propagation of the reflected OTDR signal along the optical path 520-ZA toward the endpoint 510-Z), and analyze the inserted and reflected OTDR signals for monitoring the health of various aspects of the optical path 520-ZA. For example, the PME 514-Z may detect problems (e.g., signal degradation problems, fiber cuts, component errors or failures, or the like) based on analysis of the paths via which the reflected OTDR signals are received, signal power levels of the OTDR signals, or the like, as well as various combinations thereof.

In the optical communication system 500, for the GO direction from the endpoint 510-A to the endpoint 510-Z, the endpoint 510-A is configured to insert optical signals onto the optical path 520-AZ and the endpoint 510-Z is configured to extract optical signals from the optical path 520-AZ. The endpoint 510-A includes a component 516-A that is configured to receive the optical signal 531-AZ from the SLTE 512-A and to receive monitoring signals (e.g., optical supervisory signals) from the PME 514-A, and to insert the optical signal 531-AZ from the SLTE 512-A and the monitoring signals from the PME 514-A onto the optical path 520-AZ in the GO direction. The endpoint 510-Z includes a component 518-Z that is configured to receive the optical signal 531-AZ (originated by the SLTE 512-A) and monitoring signals (e.g., originated by the PME 514-Z on the optical path 520-ZA in the RETURN direction and now being received back at the endpoint 510-Z via the optical path 520-AZ in the GO direction) via the optical path 520-AZ, and to provide the optical signal 531-AZ to the SLTE 114-Z and to provide the monitoring signals to the PME 514-Z (e.g., for analysis of the monitoring signals).

In the optical communication system 500, for the RETURN direction from the endpoint 510-Z to the endpoint 510-A, the endpoint 510-Z is configured to insert optical signals onto the optical path 520-ZA and the endpoint 510-A is configured to extract optical signals from the optical path 520-ZA. The endpoint 510-Z includes a component 516-Z that is configured to receive the optical signal 531-ZA from the SLTE 512-Z and to receive monitoring signals (e.g., optical supervisory signals) from the PME 514-Z, and to insert the optical signal 531-ZA from the SLTE 512-Z and the monitoring signals from the PME 514-Z onto the optical path 520-ZA in the RETURN direction. The endpoint 510-A includes a component 518-A that is configured to receive the optical signal 531-ZA (originated by the SLTE 512-Z) and monitoring signals (e.g., originated by the PME 514-A on the optical path 520-AZ in the GO direction and now being received back at the endpoint 510-A via the optical path 520-ZA in the RETURN direction) via the optical path 520-ZA, and to provide the optical signal 531-ZA to the SLTE 514-A and to provide the monitoring signals to the PME 514-A (e.g., for analysis of the monitoring signals).

In the optical communication system 500, the components 516 (e.g., components 516-A and 516-Z) and the components 518 (e.g., components 518-A and 518-Z) may include various types of components such as multiplexers, demultiplexers, WSSs, WSSs with optical amplifiers (e.g., EDFAs or other suitable types of amplifiers), WSS-type devices with or without optical amplifiers, or the like, as well as various combinations thereof.

The optical communication system 500 is configured to support remote monitoring of the optical path 520-AZ that includes the ROPA 513-AZ. The monitoring of the optical path 520-AZ that includes the ROPA 513-AZ is based on a pair of OTDR paths 540. The OTDR paths 540 are configured to couple optical signals reflected on optical path 520-AZ back toward the endpoint 510-A (and, thus, traveling in the RETURN direction on the optical path 520-AZ back toward the endpoint 510-A) into the optical path 520-ZA for delivery back to the PME 514-A.

In the optical communication system 500, the pair of OTDR paths 540 includes an OTDR path 540-1 connected from a point on the optical path 520-AZ to a point on the optical path 520-ZA. For example, the point on the optical path 520-AZ may be near the output of the endpoint 510-A in the GO direction and the point on the optical path 520-ZA may be near the input to the endpoint 510-A in the RETURN direction. The OTDR path 540-1 is configured to monitor the portion of the optical path 520-AZ between the point on the optical path 520-AZ that is near the output of the endpoint 510-A in the GO direction and the input to the ROPA 513-AZ.

In the optical communication system 500, the pair of OTDR paths 540 includes an OTDR path 540-2 connected from a point on the optical path 520-AZ to a point on the optical path 520-ZA. For example, the point on the optical path 520-AZ may be after the ROPA 513-AZ and before the input to the endpoint 510-Z in the GO direction and the point on the optical path 520-ZA may be near the output from the endpoint 510-Z in the RETURN direction. For example, where the optical communication system 500 supports a pair of optical supervisory paths and an associated pair of optical supervisory signals around the ROPA 513-AZ (e.g., similar to the optical supervisory paths 140 and optical supervisory signals 150 of FIG. 1, but which are omitted from FIG. 5 for purposes of clarity): (1) the point on the optical path 520-AZ may be between the output of the ROPA 513-AZ and the point at which the optical supervisory path after the ROPA 513-AZ in the GO direction connects to the optical path 520-AZ (which also would correspond to a point of extraction of the associated optical supervisory signal from the optical path 520-AZ for propagation via that optical supervisory path) and (2) the point on the optical path 520-ZA may be downstream of the point at which the optical supervisory paths connect to the optical path 520-ZA in RETURN direction (which also would correspond to a location on the optical path 520-ZA that is downstream of a point of insertion of the optical supervisory signals into the optical path 520-ZA). The OTDR path 540-2 is configured to monitor the portion of the optical path 520-AZ between the output of the ROPA 513-AZ on the optical path 520-AZ and the input to the endpoint 510-Z, since any OTDR signals reflected on the optical path 520-AZ downstream of the ROPA 513-AZ will be blocked by the ROPA 513-AZ and, thus, can only be detected by the PME 514-A at the endpoint 510-A based on use of the OTDR path 540-2 to couple the reflected OTDR signals from the optical path 520-AZ to the optical path 520-ZA.

It will be appreciated that, although primarily presented herein with respect to example embodiments in which either optical supervisory paths and associated optical supervisory signals are used in an optical communication system for supervision of optical paths in the optical communication system (e.g., as in FIG. 1-FIG. 4) or OTDR paths and associated OTDR signals are used in an optical communication system for supervision of optical paths in the optical communication system (e.g., as in FIG. 5), in at least some example embodiments both optical supervisory paths and associated optical supervisory signals and OTDR paths and associated OTDR signals may be employed within the same optical communication system to support supervision of optical signals in the optical communication system.

Figure 6:
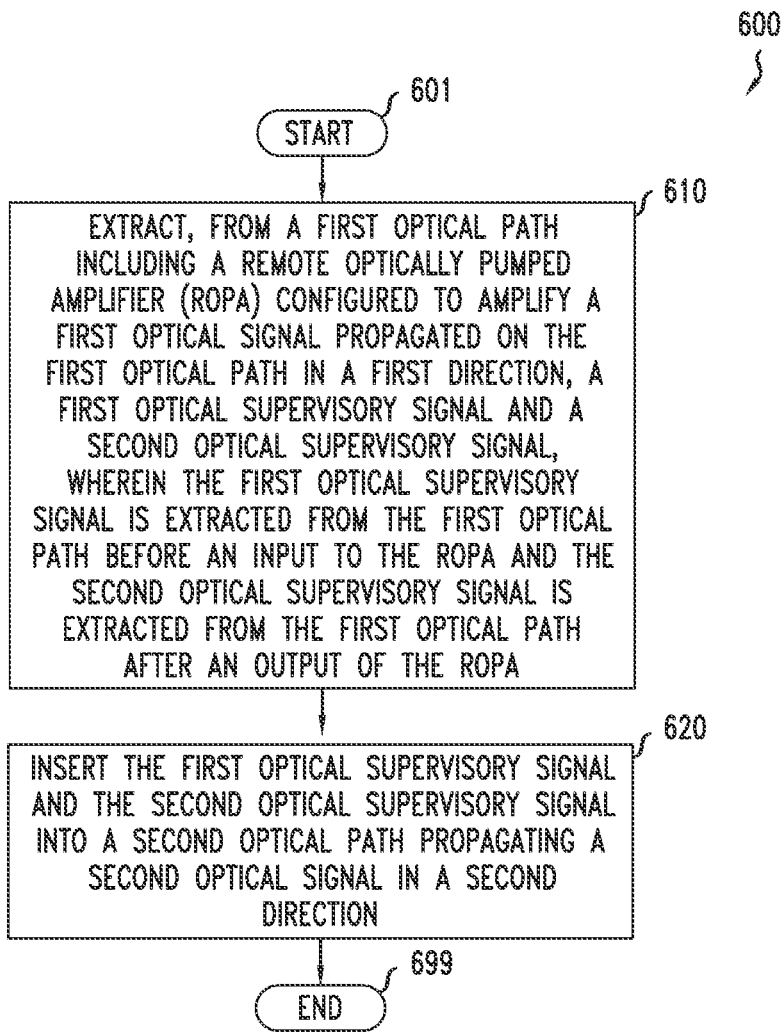
FIG. 6 depicts an example embodiment of a method for supporting supervision of an optical path including ROPA.

FIG. 6 depicts an example embodiment of a method for supporting supervision of an optical path including a ROPA. It will be appreciated that, although primarily presented as being performed serially, at least a portion of the functions of method 600 may be performed contemporaneously or in a different order than as presented with respect to FIG. 6. At block 601, method 600 begins. At block 610, extract, from a first optical path including a remote optically pumped amplifier (ROPA) configured to amplify a first optical signal propagating on the first optical path in a first direction, a first optical supervisory signal and a second optical supervisory signal, wherein the first optical supervisory signal is extracted from the first optical path before an input to the ROPA and the second optical supervisory signal is extracted from the first optical path after an output of the ROPA. At block 620, insert the first optical supervisory signal and the second optical supervisory signal into a second optical path propagating a second optical signal in a second direction. At block 699, the method 600 ends. It will be appreciated that various other aspects of FIGS. 1-5 also or alternatively may be incorporated within the method 600 of FIG. 6.

Various example embodiments for supporting supervision of optical communication systems may provide various advantages or potential advantages. For example, various example embodiments for supporting supervision of optical communication systems may be configured to support monitoring of an optical communication system including a ROPA. For example, various example embodiments for supporting supervision of optical communication systems may be configured to support monitoring of an unrepeatered optical communication system including a ROPA. For example, various example embodiments for supporting supervision of optical communication systems may be configured to support monitoring of an unrepeatered optical communication system including a ROPA without having to rely solely on use of OTDR signals which, since a ROPA either does not let OTDR signals through or strongly attenuates OTDR signals, would only be able to use the dark fibers of the cable without the ROPA or would only permit monitoring up to the ROPA since the ROPA would prevent the reflected OTDR signals from passing or would strongly attenuate the reflected OTDR signals. For example, various example embodiments for supporting supervision of optical communication systems may be configured to support monitoring of an unrepeatered optical submarine communication system, thereby enabling monitoring of submerged paths and components (e.g., submerged plant elements such as the fiber and the optical amplifiers) that, generally, are not accessible (or at least not easily accessible) for monitoring. Various example embodiments for supporting supervision of optical communication systems may provide various other advantages or potential advantages.

Figure 7:
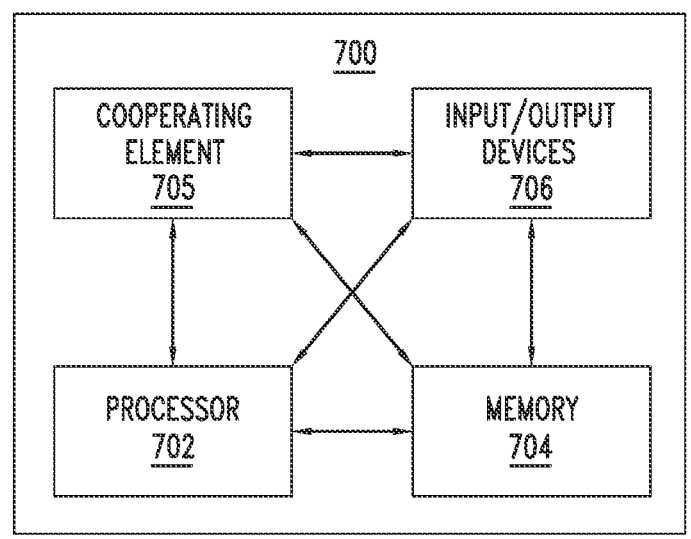
FIG. 7 depicts an example of a computer suitable for use in performing various functions presented herein.

FIG. 7 depicts an example embodiment of a computer suitable for use in performing various functions presented herein.

The computer 700 includes a processor 702 (e.g., a central processing unit, a processor, a processor having a set of processor cores, a processor core of a processor, or the like) and a memory 704 (e.g., a random access memory, a read only memory, or the like). The processor 702 and the memory 704 may be communicatively connected. In at least some embodiments, the computer 700 may include at least one processor and at least one memory including instructions wherein the instructions are configured to, when executed by the at least one processor, cause the apparatus to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as an endpoint 110 or a portion thereof, an SLTE 112 or a portion thereof, a PME 114 or a portion thereof, an endpoint 510 or a portion thereof, an SLTE 512 or a portion thereof, a PME 514 or a portion thereof, or the like, as well as various combinations thereof.

The computer 700 may be used to support various functions as presented herein. For example, the computer 700 may be used to control generation of optical supervisory signals, analysis of optical supervisory signals, storage and analysis of results related to use of optical supervisory signals (e.g., saving supervision traces and comparing them over time to monitor changes), or the like, as well various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various example embodiments which incorporate the teachings presented herein have been shown and described in detail herein, those skilled in the art can readily devise many other varied embodiments that still incorporate these teachings.

What is claimed is:

1. An apparatus, comprising:
a remote optically pumped amplifier (ROPA) configured to amplify a first optical signal of a first optical path configured to propagate the first optical signal in a first direction; and
a set of one or more first elements configured to extract a first optical supervisory signal from the first optical path before an input to the ROPA, a set of one or more second elements configured to extract a second optical supervisory signal from the first optical path after an output of the ROPA, and a set of one or more third elements configured to insert the first optical supervisory signal and the second optical supervisory signal into a second optical path configured to propagate a second optical signal in a second direction.

2. The apparatus of claim 1, wherein the first optical supervisory signal has a first wavelength and the second optical supervisory signal has a second wavelength different than the first wavelength.

3. The apparatus of claim 1, wherein the one or more first elements comprises a coupler and a transmission filter.

4. The apparatus of claim 1, wherein the one or more first elements comprises a coupler and a reflector.

5. The apparatus of claim 1, wherein the one or more first elements comprises a transmission filter.

6. The apparatus of claim 1, wherein the one or more second elements comprises a coupler and a transmission filter.

7. The apparatus of claim 1, wherein the one or more second elements comprises a coupler and a reflector.

8. The apparatus of claim 1, wherein the one or more second elements comprises a transmission filter.

9. The apparatus of claim 1, wherein the one or more third elements comprises a coupler.

10. The apparatus of claim 1, wherein the one or more third elements comprises a first coupler configured to combine the first optical supervisory signal and the second optical supervisory signal onto a common path and a second coupler configured to insert the first optical supervisory signal and the second optical supervisory signal from the common path into the second optical path.

11. The apparatus of claim 1, wherein the one or more third elements comprises a transmission filter.

12. The apparatus of claim 1, wherein the one or more third elements comprises a coupler and a transmission filter.

13. The apparatus of claim 1, further comprising:
a first optical supervisory path configured to propagate the first optical supervisory signal from the first optical path to the second optical path; and
a second optical supervisory path configured to propagate the second optical supervisory signal from the first optical path to the second optical path.

14. The apparatus of claim 1, further comprising:
an optical time-domain reflectometer, (OTDR) path coupled from a location on the first optical path after an output of the ROPA to a location on the second optical path.

15. The apparatus of claim 1, wherein the ROPA is configured to be associated with a receiver side of the first optical path.

16. The apparatus of claim 1, wherein the ROPA is configured to be associated with a transmitter side of the first optical path.

17. The apparatus of claim 1, wherein the apparatus includes an unrepeatered submarine transmission system.

18. An apparatus, comprising:
a remote optically pumped amplifier (ROPA) configured to amplify a first optical signal of a first optical path configured to propagate the first optical signal in a first direction; and
a set of elements configured to extract a first optical supervisory signal from the first optical path before an input to the ROPA, extract a second optical supervisory signal from the first optical path after an output of the ROPA, and insert the first optical supervisory signal and the second optical supervisory signal into a second optical path configured to propagate a second optical signal in a second direction;
wherein the set of elements is configured to support a first optical supervisory path configured to propagate the first optical supervisory signal from the first optical path to the second optical path and a second optical supervisory path configured to propagate the second optical supervisory signal from the first optical path to the second optical path, wherein the first optical supervisory path comprises at least one of a coupler, a transmission filter, or a reflector, and the second optical supervisory path comprises at least one of a coupler, a transmission filter, or a reflector.

19. An apparatus, comprising:
a remote optically pumped amplifier (ROPA) configured to amplify a first optical signal of a first optical path configured to propagate the first optical signal in a first direction,
a set of elements configured to extract a first optical supervisory signal from the first optical path before an input to the ROPA, extract a second optical supervisory signal from the first optical path after an output of the ROPA, and insert the first optical supervisory signal and the second optical supervisory signal into a second optical path configured to propagate a second optical signal in a second direction; and
an optical time-domain reflectometer (OTDR) path coupled from a location on the first optical path after an output of the ROPA to a location on the second optical path, wherein the location on the first optical path is between the output of the ROPA and a point of extraction of the second optical supervisory signal from the first optical path, wherein the location on the second optical path is downstream of a point of insertion of the first optical supervisory signal and the second optical supervisory signal into the second optical path.

20. A method, comprising:
- extracting, from a first optical path including a remote optically pumped amplifier (ROPA) configured to amplify a first optical signal propagating on the first optical path in a first direction, a first optical supervisory signal with a set of one or more first elements and a second optical supervisory signal with a set of one or more second elements, wherein the first optical supervisory signal is extracted from the first optical path before an input to the ROPA and the second optical supervisory signal is extracted from the first optical path after an output of the ROPA; and
- inserting the first optical supervisory signal and the second optical supervisory signal into a second optical path configured to propagate a second optical signal in a second direction with a set of one or more third elements.

* * * * *